Aug. 23, 1949.    M. R. EASTMAN    2,479,915
LOW-PRESSURE INDICATOR
Filed Oct. 25, 1946

INVENTOR
MARGUERITE R. EASTMAN

BY Joseph B. Saidner
her atty.

Patented Aug. 23, 1949

2,479,915

UNITED STATES PATENT OFFICE 2,479,915

LOW-PRESSURE INDICATOR

Marguerite R. Eastman, Richmond, Calif.

Application October 25, 1946, Serial No. 705,779

5 Claims. (Cl. 116—34)

This invention relates to devices for indicating when a pressure below a normal prescribed degree exists in a chamber or other container of air maintained at a pressure above atmospheric.

An object of the invention is to provide a device of the character described adapted for use with pneumatic tires and as part of the valve stem caps used with such tires.

Another object of the invention is to provide a device of the nature referred to which is characterized by marked simplicity and ruggedness of construction so as to be both low in cost and capable of a long useful life.

A further object of the invention is to provide, in a screw cap device of the character described capable of snapping from a set to an unset position to display a visible signal when air pressure imposed on the device falls below a prescribed degree, structure which effects an automatic setting of the device by the action of screwing the latter on a suitably threaded receiving element which, in the case of a tire, may be the valve stem.

Still another object of the invention is to provide, in a device of the class referred to, a yieldable element serving the dual function of a gauge member, responsive to fluctuations of air pressure within the container with which the device may be used and capable of tripping the device when the low pressure level is reached, and of a spring element capable of actuating a signal announcing when said low pressure level is reached or passed.

A still further object of the invention is to provide a low pressure indicator, for use with articles such as pneumatic tires, which is of minimum size, not materially exceeding the size of the conventional stem cap used with such tires.

The invention possesses other objects and features of advantage, some of which, with the foregoing, will be set forth in the following description of the preferred form of the invention which is illustrated in the drawings accompanying and forming part of the specification. It is to be understood, however, that variations in the showing made by the said drawings and description may be adopted within the scope of the invention as set forth in the claims.

Referring to the drawing.

Figure 3:
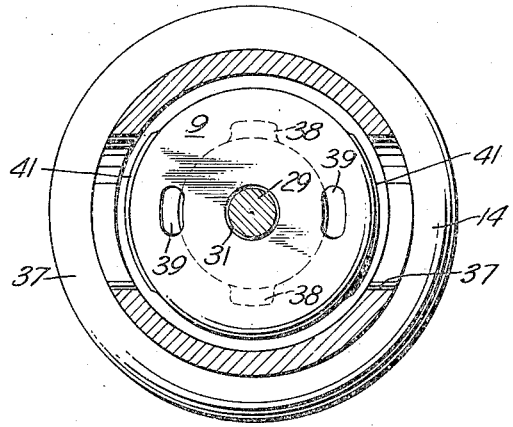
Figure 3 is a horizontal sectional view taken in the plane indicated by the line 3—3 of Figure 1.

In the form of my invention illustrated in the drawing I have shown the upper end of a conventional tire valve stem 4 fitted with the usual sealing valve 6 having the operating rod 7 extending therefrom. I provide a cylindrical cap 8 provided with a top wall 9 and a lower diametrically enlarged bell portion 11 provided with internal screw threads 12 corresponding and engaged with the external screw threads 13 of the valve stem 4. The upper portion of the bell 11, where the latter joins the lower end of the cap 8, is provided with an annular diametrically expanded bead 14 outlining an internal circumferential groove 16 in which is vulcanized or otherwise suitably secured the lower marginal flange 17 of a tubular pressure dome 18 which extends upwardly in axial concentricity with the cap 8 and which has a chamber 19 therein open at its lower end to receive air from the valve stem 4 and closed at its upper end by an end wall 21 having an aperture 22 formed centrally thereof. The pressure dome 18 and its flange 17 is constructed of rubber or a material possessing the characteristics of rubber which will permit an appreciable amount of axial stretching to take place in the dome and which will produce a spring-like action when the pressure dome is twisted about its cylindrical axis. Here it should be pointed out that the thickness of the cylindrical wall of the pressure dome 18 is important to the proper functioning of the device and has a direct bearing on the degree of axial expansion that may occur for a given air pressure in the pressure dome. Consequently, the thinner the wall section, the less pressure is required to operate the device and the thicker the wall section, the greater the pressure will have to be. It is thus possible, by pre-calculating the wall thickness, to establish the pressure range within which operation may take place. Extending downwardly axially concentrically of the pressure dome 18 is a depressor rod 23 whose lower end is arranged to engage and depress the valve operating rod 7 when the device of my invention is screwed onto the valve stem so as to open the valve 6 and establish communication between the tire tube and the chamber 19 and thereby admit compressed air into the latter chamber. The upper end of the depressor rod is provided with an integral collar 24 or the like bearing against the lower surface of a washer 26 lying against the end wall 21 within the chamber 19. The washer 26, which is of sufficient diameter to substantially cover the end wall, is provided with a central aperture corresponding and axially aligned with the aperture 22 through which passes an integral extension 27 of the depressor rod 23, which extension also passes through the central aperture of a washer 28 exteriorly overlying the end wall 21. A collar or upset portion 29 of the extension 27 overlies the washer 28 and, in conjunction with the collar 24, serves to securely squeeze the end wall of the pressure dome between the washers 26 and 28. The collar or upset portion 29 of the depressor rod extends upwardly through a central clearance aperture 31 formed in the top wall 9 of the cap 8 and is formed at its outer end with an integral stud 32 of rectangular or equivalent cross-sectional form other than circular, which is received in the correspondingly-shaped central aperture provided in the end wall 33 of a bell-shaped rotor 34 extending downwardly in overlying and concentric relation with the cap 8. The upper end of the stud 32 is formed with a peened head 36 securing the stud to the rotor end wall 33. The cylindrical skirt of the rotor is provided with preferably a pair of diametrically opposed apertures 37, of a diameter substantially equal to about one-fourth of the circumference of the skirt, whose function will be explained presently. Locking means, releasable under certain conditions, is also provided between the rotor and the cap and comprises one or more upwardly extending lugs 38 formed on the washer 28 which are adapted to register with and enter corresponding apertures 39 formed in the cap end wall 9. In the normal released position the lugs 38 are offset about ninety degrees with respect to the apertures 39 so that it requires about a quarter turn of the rotor to bring the lugs and apertures into relative registry. A more detailed explanation of this operation will be given presently.

Figure 1:
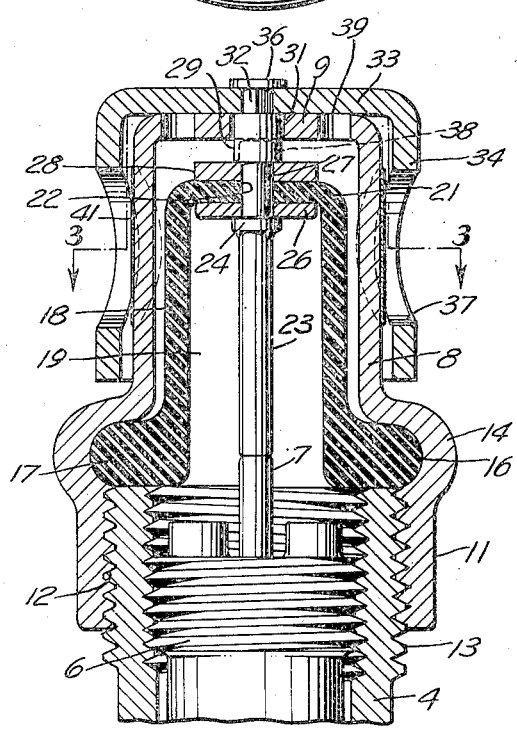
Figure 1 is an enlarged vertical sectional view of the indicator of my invention applied to the upper end portion of a pneumatic tire valve stem. The positions of the parts are shown as they exist when subnormal pressure exists in the tire.
Figure 2:
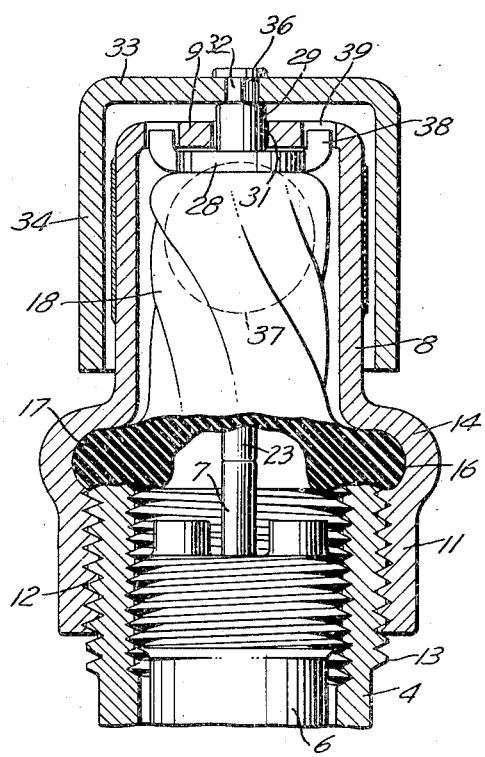
Figure 2 is a view similar to Figure 1 showing the positions of the parts when abnormal pressure exists in the tire and the signal device is held in readiness for release to be displayed.

Let us assume that the tire to which the device of my invention is applied should be maintained at a maximum inflation pressure of thirty-five pounds per square inch and that this pressure should not be allowed to drop below, let us say, thirty pounds to the square inch. Previously to applying the indicator to the valve stem of the tire, the proper maximum pressure of air is placed in the tire. The indicator is then grasped, by the finger tips, on the rotor 34 and is screwed onto the threaded end of the valve stem in a manner identical to the way in which a conventional stem cap is applied. However, during the course of applying the indicator of my invention, the depressor rod 27 will impinge against the exposed end of the operating rod 7 and as the threaded engagement becomes greater, the tire valve will be forced open thus admitting the full pressure of the air in the tire into the chamber 19 of the resilient pressure dome 18. This will immediately stretch the pressure dome axially upwardly so as to cause the lugs 38 to press with considerable force against the inner or under side of the cap top wall 9. As rotation of the indicator proceeds, in the operation of threadedly engaging it with the valve stem, the flange 17 of the pressure dome will finally come to rest on the upper end of the valve stem which will momentarily arrest rotational movement of the cap 8 but will permit continued manual rotation of the rotor 34. When such relative rotation is effected between the rotor and cap so that the former is advanced one-quarter turn ahead of the cap, the lugs 38 will be brought into registry with the apertures 39 and will snap thereinto due to the upward force imposed on the lugs by the expansive stress stored in the pressure dome and due to the air pressure in the chamber 19. The rotor and cap are thus locked together, and continued rotation of the rotor will further engage the threads 12 and 13 to compress the flange 17 against the upper end of the valve stem and thus tightly seal the latter against leakage. The final set position of the indicator is shown in Figure 2 wherein it will be particularly noted that when the rotor and cap are locked together by interengagement of the lugs 38 and apertures 39, the pressure dome 18 will be twisted a quarter turn similar to the position in which the rotor is held relative to the cap. Thus a torsional force is stored in the pressure dome tending to return the latter to its unstressed position as shown in Figure 1. As the pressure in the tire naturally decreases, due to slow leakage or exudation, the pressure in the chamber 19 will decrease correspondingly thereby permitting the axially extended pressure dome 18 to contract until, when the pressure in the chamber reaches the lower permissible degree, at which the pressure dome has been designed to operate, the lugs 38 will have been drawn downwardly to such an extent that they will escape from the apertures 39 whereupon the twisted pressure dome will snap the rotor back to its free normal position shown in Figure 1. When the rotor is in such position the apertures 37 thereof will overlie and expose suitably colored spots 41 painted or otherwise applied to the outer peripheral surface of the cap 8. These spots, when the indicator was in set position as shown in Figure 2, were concealed from view by the solid portions of the rotor skirt lying circumferentially between the apertures. When during routine inspections of the vehicle, the motorist discerns said colored spots showing through the rotor apertures of one or more indicators he will be informed that the tires bearing such spot-displaying indicators have reached the minimum safe degree of inflation and should be serviced to bring the air pressure therein to the proper maximum level.

It will be seen from the above description of the preferred form of my invention that the indicator device is simple and rugged in construction, is capable of long trouble-free life in performing the functions for which it was originally designed and is sufficiently small as to be as inconspicuous as the conventional valve stem cap in common use.

I claim:

1. A low-pressure indicator comprising a cap member attachable in fixed relation to a container of fluid under pressure, a rotor movable on said cap member between a set position and an unset position, said rotor being operative when in unset position to display a signal, means for receiving fluid under pressure from said container and being yieldably deformable under the pressure of said fluid, said means being affixed at one end thereof to said cap member and attached at the other end to said rotor, latch means associated with said cap and rotor, said latch means being relatively rotationally offset when the rotor is in unset position and alignable by manual relative rotary movement between said cap and rotor and when so aligned cooperative to hold said rotor in set position upon deformation of said fluid receiving means, and said fluid receiving means being torsionally stressed when the rotor is in set position to forcibly return the rotor to unset position when the latch means is released upon contraction of said fluid receiving means to display said signal.

2. A low pressure indicator comprising a cap member attachable in fixed relation to a container of fluid under pressure, a rotor movable on said cap member between a set position and an unset position, said rotor being operative when in unset position to display a signal, means for receiving fluid under pressure from said container and being yieldably deformable under the pressure of said fluid, the bottom of said fluid receiving means being secured to said cap member and the top of said means being attached to said rotor, latch means associated with said cap and rotor, said latch means being relatively rotationally offset when the rotor is in unset position and alignable by manual relative rotary movement between said cap and rotor and when so aligned cooperative to hold said rotor in set position upon deformation of said fluid receiving means, means spring-tensioning and imposing torsional stress on said rotor when the latter is in set position tending to return the rotor to unset position, and means on said rotor cooperative with and to display said signal when the rotor is moved to unset position.

3. A low-pressure indicator comprising a cap member attachable in fixed relation to a stem element having therein a valved passage communicating with a container of fluid under pressure and having an exposed operating rod for the valve, a depressor rod journaled in said cap member, said rod having a portion engageable with and to open said valve when the cap member is attached to said stem element, a rotor rotatable relative to said cap member and fixed for rotation with said depressor rod, cooperative latch elements associated respectively with said cap member and said depressor rod, a pressure dome of yieldable material having a portion thereof secured to said cap member and another portion thereof secured to said depressor rod, said pressure dome having therein a chamber for receiving fluid under pressure from said container when the valve is open, said pressure dome when a maximum degree of fluid pressure exists in said chamber being fully expanded to move the latch elements toward cooperative relationship and when a lesser degree of fluid pressure exists in the chamber being contracted from fully expanded position to move the latch elements out of relative engagement, said latch elements being relatively rotationally offset and alignable by manual relative rotary movement between said cap member and rotor, said pressure dome during said relative rotary movement between the cap member and rotor being torsionally stressed so as to forcibly return the rotor upon release of the latch elements to a position wherein the latch elements are relatively offset, and cooperative signal displaying means on said cap member and rotor operative to display a signal when said latch elements are relatively offset.

4. A low-pressure indicator comprising a cap member attachable in fixed relation to a stem element having therein a valved passage communicating with a container of fluid under pressure and having an exposed operating rod for the valve, a depressor rod journaled in said cap member, said rod having a portion engageable with and to open said valve when the cap member is attached to said stem element, a rotor rotatable relative to said cap member and fixed for rotation with said depressor rod, cooperative latch elements associated respectively with said cap member and said depressor rod, a pressure dome of yieldable material having a portion thereof secured to said cap member and another portion thereof secured to said depressor rod, said pressure dome having therein a chamber for receiving fluid under pressure from said container when the valve is open, said pressure dome when a maximum degree of fluid pressure exists in said chamber being fully expanded to move the latch elements toward cooperative relationship and when a lesser degree of fluid pressure exists in the chamber being contracted from fully expanded position to move the latch elements out of relative engagement, said latch elements being relatively rotationally offset and alignable by manual relative rotary movement between said cap member and rotor, said pressure dome during said relative rotary movement between the cap member and rotor being torsionally stressed so as to forcibly return the rotor upon release of the latch elements to a position wherein the latch elements are relatively offset, signal means on said indicator concealed when said latch elements are in relative engagement, and means operative with said rotor for revealing said signal means when the latch elements are relatively disengaged.

5. A low-pressure indicator comprising a tubular cap member attachable in fixed relation to a stem element having therein a valved passage communicating with a container of fluid under pressure and having an exposed operating rod for the valve, said cap member having a transaxial end wall provided with a central journal opening and a latch aperture spaced radially from said journal opening, a depressor rod axially concentric with said cap member and extending in slidable and rotative relation with and through said journal opening, said depressor rod having a portion thereof engageable with said operating rod so as to open said valve when the cap member is attached to said stem element, a tubular rotor concentric with and having a skirt portion overlying said cap member, said rotor being secured to and rotatably movable with said depressor rod, said skirt portion having an opening therein, a pressure dome of yieldable material within said cap member having a portion secured to said cap member and another portion secured to said depressor rod, said pressure dome having therein a chamber for receiving fluid under pressure from said container when the stem valve is open, a member secured to said depressor rod having a latch element thereon cooperative with the latch aperture of the cap member end wall, said pressure dome when a maximum degree of fluid pressure exists in said chamber being fully expanded to move the depressor rod latch element toward cooperative relationship with the latch aperture and when a lesser degree of fluid pressure exists in the chamber being contracted from fully expanded position to move the latch element and latch aperture away from cooperative relationship, said latch element and latch aperture being relatively rotationally offset and alignable by manual relative rotary movement between said cap member and rotor, said latch element when aligned with said latch aperture being moved into engagement with the latter by the fluid-pressure expansion of the pressure dome, said pressure dome during said relative rotary movement between the cap member and rotor being torsionally stressed so as to forcibly return the latch element when released from the latch aperture by a lessening of fluid pressure in the chamber toward relatively offset relation with the latch aperture, and a signal element on said cap member discernible through said rotor skirt opening when said latch element and latch aperture are in relatively offset positions.

MARGUERITE R. EASTMAN.

REFERENCES CITED

The following references are of record in the file of this patent:

UNITED STATES PATENTS

| Number | Name | Date |
|---|---|---|
| 1,668,821 | Rice | May 8, 1928 |

FOREIGN PATENTS

| Number | Country | Date |
|---|---|---|
| 12,841 | France | Sept. 14, 1910 |
| | (Addition to No. 415,668) | |
| 337,185 | Great Britain | Nov. 6, 1930 |